United States Patent [19]

Brooks

[11] Patent Number: 4,525,233
[45] Date of Patent: * Jun. 25, 1985

[54] IMPROVEMENTS RELATING TO METHOD AND APPARATUS FOR JOINING SHEET MATERIAL

[76] Inventor: Ronald H. Brooks, 6 Baxter Ct., Chelsea, Vic. 3196, Australia

[*] Notice: The portion of the term of this patent subsequent to Nov. 22, 2000 has been disclaimed.

[21] Appl. No.: 525,651

[22] Filed: Aug. 23, 1983

[30] Foreign Application Priority Data

Dec. 24, 1981 [SU] U.S.S.R. ............................ PF2085

[51] Int. Cl.³ ............................................. B32B 31/26
[52] U.S. Cl. .............................. 156/273.9; 156/275.1; 156/304.4; 156/304.6; 156/304.7; 156/344; 219/529; 219/543; 219/549; 428/57; 428/58
[58] Field of Search ...................... 156/64, 272.2, 273.3, 156/273.9, 275.1, 275.3, 275.7, 289, 304.3, 304.4, 304.6, 304.7, 308.2, 308.4, 344; 219/529, 543, 549; 428/57, 58

[56] References Cited

U.S. PATENT DOCUMENTS

| | | | |
|---|---|---|---|
| 3,387,248 | 6/1968 | Rees | 219/549 |
| 3,415,703 | 12/1968 | Burgess | 156/304.4 |
| 3,533,876 | 10/1970 | Burgess | 156/304.4 |
| 3,564,204 | 2/1971 | Mense | 156/304.7 |
| 3,816,203 | 6/1974 | Bascom et al. | 156/304.4 |
| 4,132,578 | 1/1979 | Gell, Jr. | 156/289 |
| 4,206,169 | 6/1980 | Hall | 156/344 |
| 4,398,985 | 8/1983 | Eagon | 156/344 |
| 4,416,713 | 11/1983 | Brooks | 156/64 |

FOREIGN PATENT DOCUMENTS 464878 8/1972 Australia .

Primary Examiner—Edward Kimlin
Assistant Examiner—Merrell C. Cashion
Attorney, Agent, or Firm—Shlesinger, Arkwright, Garvey & Fado

[57] ABSTRACT

A method and apparatus for adhesively bonding together in edge abutting relationship two sheets of woven, felted, or other textile material such as carpet using a joining tape which includes a removable electrically conductive foil and layer of heat so/tenable adhesive. The control circuit maintains the adhesive in a tacky state while the abutting edges which overlap the tape are adjusted as required to form the desired joint.

6 Claims, 4 Drawing Figures

IMPROVEMENTS RELATING TO METHOD AND APPARATUS FOR JOINING SHEET MATERIAL

FIELD OF THE INVENTION

This invention relates to an improved method and apparatus for joining sheet material such as floor covering material, for example, carpets, synthetic sporting surfaces and other sheet material which is abutted edge-to-edge. The invention also relates to a method and apparatus for separating sheet material previously joined by a heat softenable adhesive and joining tape.

BACKGROUND OF THE INVENTION

While the invention can be used for joining and separating a variety of forms of sheets material including fabrics, wall surfacing materials and the like, the invention will be described hereinafter in relation to the joining and separating of carpet material.

It is well known to join adjacent abutting edges of carpets with a joining tape which is adhered to the carpet backing by an adhesive which may be either a solvent adhesive or, more recently, a heat softenable adhesive. In one known system, a carpet bonding tape is used which consists of a layer of material, such as paper, a layer of fabrice, woven material or other reinforcing material and an upper layer of a heat softenable adhesive composition, the nature and thickness of the heat softenable adhesive composition being such that an adhesive bond is formed between the fabric, woven material or reinforcing material and the underside of a carpet material when the tape is used in an operation in which heat is applied to the carpet and the adhesive by a heated "iron" which is moved along the seam to be joined. When the carpet material is pressed onto the heat softened adhesive layer and the heating source removed, the adhesive sets to thereby bond the carpet edges to the fabric, woven material or other reinforcing material.

The application of heat by the method described above to "melt" the adhesive is extremely difficult to control and a danger exists of burning or melting the carpet pile and/or backing.

Australian Pat. No. 464,878 describes a carpet bonding tape which consists of a layer of heat insulating material such as paper, a layer of metal foil and an upper layer of a ribbon of heat softenable adhesive composition, the nature and thickness of the ribbon of heat softenable adhesive composition being such that an adhesive bond is formed with the underside of a carpet material when the tape is used in an operation in which the carpet material is pressed onto the heat softened adhesive layer. The adhesive composition is softened by passing an electric current through the metal foil. A woven textile material may also be embedded in the ribbon of adhesive material to reinforce the tape.

In my U.S. application Ser. No. 171,865 filed July 24, 1980, I have described an improved method and apparatus for joining sheet material wherein the electrical current flow through the metal foil is controlled to thereby control the degree of softening of the adhesive to enable the carpet join to be correctly aligned prior to being adhered to the bonding tape.

While the carpet joining methods previously described generally provide a relatively firm joint between the edges of adjacent sheets of carpet material, it has been found that the cost of the electrically heated carpet bonding tape including the integral metal foil strip is relatively high. It has been thought necessary to bond the metal foil strip to the other layers constituting the carpet bonding tape i.e. the paper backing, reinforcing and adhesive materials, in order to ensure even heating of the adhesive and accurate alignment of the tape beneath the edge portions of the carpet material to be joined. However, I have now found that it is not necessary to fix the metal foil layer to the layers of other materials in the carpet bonding tape and that better and more economical results can be achieved with the tape and method of my invention.

Further, after carpet has been laid for some time a certain amount of stretching occurs which requires the carpet to be relaid if optimum appearance and wearing qualities are to be maintained. Such relaying generally requires separating and rejoining abutting edges to maintain correct alignment thereof. Carpet edge portions which have been joined with a tape using a heated iron to melt a heat softenable adhesive are extremely difficult to separate and to remove the joining tape therefrom.

Still further, in carrying out methods of joining carpet edges using an electrically heated carpet joining tape the electric current required to pass through the foil to soften the adhesive varies with ambient temperature and also varies as the temperature of the foil increases. Such variations may result in an initial current flow through the foil which overloads the electrical supply circuit to which the controlling apparatus is connected.

It is therefore an object of the present invention to provide an improved method for joining sheet material in edge-butting relation whereby the join may be relatively quickly, simply and economically made.

It is a further object of the invention to provide a method for separating carpet joining tape which has been previously bonded to carpet edge portions with a heat softenable adhesive.

A still further object of the present invention is to provide a tape which may be used in the joining of carpet edge portions and in separating a joining tape from such edge portions.

A still further object of the invention is to provide apparatus which may be used in conjunction with a carpet bonding tape utilizing an electrically heated metal foil whereby the current flow through the foil is maintained substantially constant during heating thereof.

SUMMARY OF THE INVENTION

According to one aspect, the invention provides a seaming/unseaming tape for use in either joining edges of sheet material in abutting relation or for separating joining tape from previously seamed sheet material edge portions, the seaming/unseaming tape comprising a strip of metal foil secured to a strip of backing material, such as paper, the strip of metal foil having a transverse dimension not exceeding that of the strip of backing material and the metal foil being of a thickness such that an electric current passing through the foil causes heating thereof to a temperature to at least soften a heat softenable adhesive on a sheet material joining tape.

Preferably, the strip of metal foil is sewn to the backing material which may be formed of crepe paper, craft paper or any other suitable material which has an effect of at least partially heat insulating the foil from an underlying surface. It is preferred that the foil and backing material are stitched together using a cotton or fibreglass thread.

According to another aspect of the invention there is provided a method of joining together abutting edge portions of woven, felted or other textile sheets using a web which includes a heat softenable adhesive and a reinforcing material comprising the steps of:

(a) locating the web in contact with the abutting edges of said sheets so that the web overlaps said abutting edges, (b) locating a strip of metal foil in contact with said web, (c) passing an electric current through said metal foil to generate heat therein, (d) controlling the current flow so that the heat generated at least softens said adhesive, (e) pressing the abutting edge portions of said sheets onto said web to adhesively engage the reinforcing material with the edge portions, (f) stopping the current flow to cause the adhesive to set and bond the reinforcing material to the edge portions, and (g) removing the strip of metal foil from contact with the web.

In the preferred form of this aspect of the invention, the metal foil used is that of the seaming/unseaming tape used in conjunction with a bonding tape formed of a textile material, a synthetic plastic material such as Typar (manufactured by DuPont) or other material which, when adhered to the abutting edge portions of the textile sheets will secure those sheets together.

It will be seen that, when the seam has been correctly formed in accordance with the method of the invention, the seaming/unseaming tape is removed from beneath the formed seam and may be re-used over and over. Thus, the cost of tape used in joining the edge portions of sheet material is substantially reduced as a major part of the tape is re-used rather than being left beneath the joined edges.

According to a further aspect of the invention there is provided a method of separating a joining tape from abutting edge portions of textile sheets, said joining tape being adhered to said edge portions by a heat softenable adhesive, comprising the steps of:

(a) cutting said tape along the line of the abutting edges, (b) bending said edge portions away from each other, (c) locating a strip of metal foil along the line of the edge portions when in abutting relation (d) engaging the joining tape sections on the edge portions with said metal foil strip, (e) passing an electric current through said metal foil strip to generate heat therein, (f) controlling the current flow so that the heat generated at least softens said adhesive, and (g) peeling the cut tape sections from said edge portions.

In accordance with this aspect of the invention, it is also preferred that the metal foil strip comprises the seaming/unseaming tape previously described.

The current passed through the metal foil may be controlled manually or automatically using the apparatus described in may previously application referred to above. With the this apparatus, when used for joining together abutting edges of sheet material, the current passed through the metal foil layer is controlled to produce a heat which will soften the adhesive whereby adjustment between the edges of the sheet material can be made whereafter the temperature is raised to melt the adhesive to a bonding temperature.

It has been found that the current flowing the metal foil, and the heating effect created thereby, decreases as the temperature of the foil increases. This has the effect of slowing the seaming operation. Accordingly, it is a further aspect of the present invention to provide improved apparatus for use in seaming or unseaming abutting edge portions of woven, felted or other textile material, such as carpet, said apparatus including a web which has a reinforcing material and a heat softenable adhesive, a strip of metal foil associated with said web, means for passing an electrical current through said metal foil to thereby generate heat therein which at least softens said adhesive, means for controlling the current flow through said metal foil and means selectively operable to vary the current flow between that necessary to substantially maintain a predetermined temperature and that necessary to raise the foil temperature characterized in that said apparatus further includes means to maintain a substantially constant current flow through said metal foil when said selectively operable means is selected to raise the foil temperature irrespective of changing impedance of the heating metal foil.

In order that the invention is more readily understood embodiments will now be described with reference to the accompanying drawings.

DESCRIPTION OF THE PREFERRED EMBODIMENT

Figure 1:
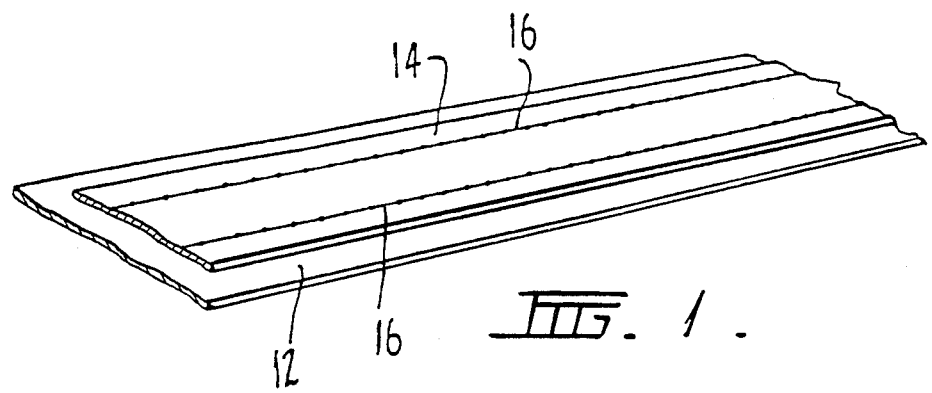
FIG. 1 is an illustrative view of one form of seaming/unseaming tape in accordance with the present invention.

Referring to FIG. 1 the seaming/unseaming tape of the invention comprises a backing 12 which maybe formed of a paper, such as craft paper or crepe paper. A strip of metal foil 14 is secured to the backing 12 by losely stitching through the foil 14 and backing 12 with a thread of cotton, fiberglass or other material which would be substantial unaffected by the heat generated in the foil 14. In FIG. 1, the foil 14 is shown to be secured to the backing 12 by two lines of stitching 16 although it would be appreciated that any number of lines of stitching maybe used.

The paper backing 12 provides a support for the foil 14 as well as acting as a heat insulator between the foil and any underlining surface on which the tape is used. The paper strip is of width at least equal to that of the foil 14 and the foil has a thickness which, when an electric current is passed therethrough, will cause the temperature of the foil to rise at least to the melting point of a heat softenable adhesive.

Figure 2:
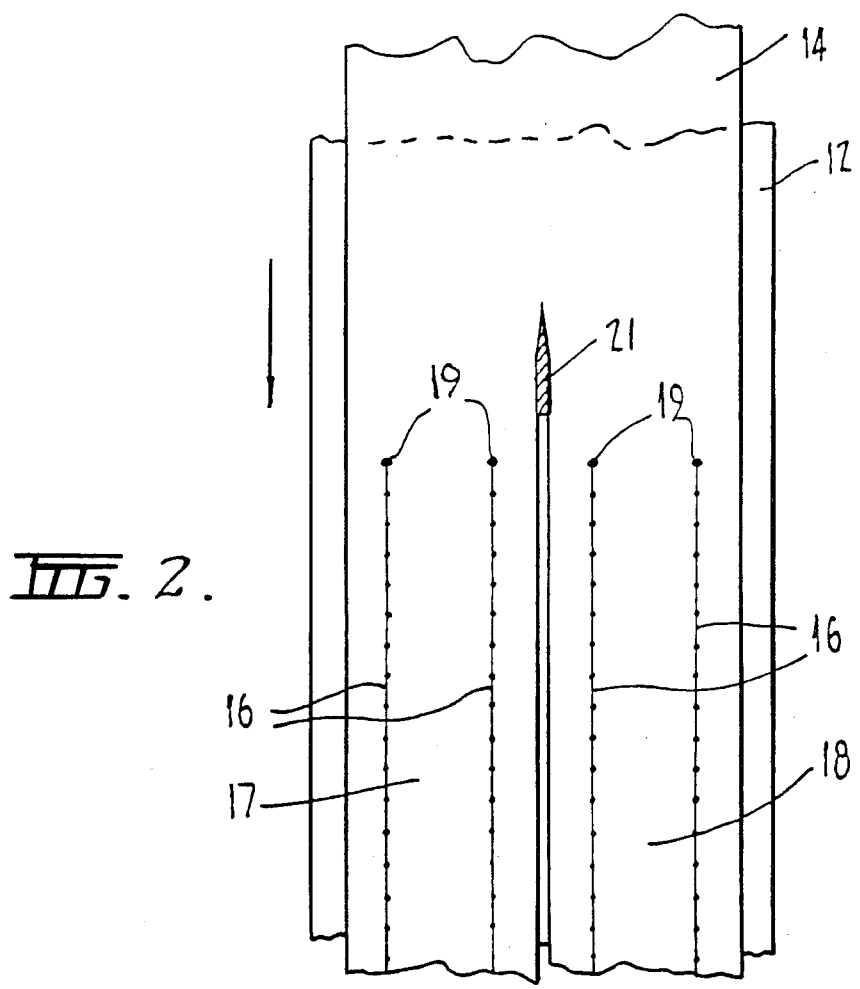
FIG. 2 is a top plan view showing the manufacture of a seaming/unseaming tape in accordance with a second embodiment of the invention.

Referring to FIG. 2 there is illustrated, in plan view, a method of manufacturing a modified form of seaming/unseaming tape according to the present invention. In this embodiment, the strip of foil is spilt into two, laterally spaced foil sections 17 and 18 which are each sewn to the backing strip 12 by two lines of sewing 16.

In the manufacture of the tape of this embodiment, a strip of foil 14 and the strip of backing material 12 are fed in overly relationship to sewing apparatus having a plurality of sewing needles 19 which produce the lines of stitching 16. A knife 21 is fixed in advance of the needles 19 to split and separate the strip of foil 14 into the two foil sections 17 and 18 prior to those sections being sewn to the backing material 12. It will therefore be seen that the resulting seaming/unseaming tape has separated foil sections 17 and 18 sewn to the backing 12 which provides a useful seaming/unseaming tape for relatively long carpet seams, as will be hereinafter described.

The tape of the invention may be used for both the joining of abutting edge portions of carpet and for removal of a joining tape previously adhered to abutting edge portions of a carpet by a heat softenable adhesive. In performing the preferred method of the invention for joining abutting edge portions of carpet the seaming/unseaming tape of the invention is located beneath a carpet joining tape having a heat softenable adhesive thereon. The carpet joining tape preferably comprises a reinforcing material such as a woven material or an unwoven material such as Typar or any other suitable reinforcing material which, when bonded to the carpet edge portions, securely holds those edge portions in abutting relation. The adhesive is preferably a thermoplastic adhesive material such as that described in my U.S. application Ser. No. 171,865. The seaming/unseaming tape and the overlying carpet joining tape are positioned beneath the adjacent edge portions of the carpet pieces to be joined so that the edge portions overlap the joining tape along the length thereof with the edges meeting approximately along the middle of the carpet joining tape. An electrical current is caused to pass along the metal foil of the seaming/unseaming tape to thereby generate heat in the metal foil to at least soften the adhesive on the carpet joining tape. When the adhesive becomes tacky the carpet portions are lightly bonded to the carpet joining tape whereby adjustment of the edge portions may be made to match patterns on the carpet and to ensure that the edges are closely abutting. The current flow in the metal foil is then increased so as to generate sufficient heat to fully melt the adhesive whereafter the current flow is terminated to allow the adhesive to set and thereby securely bond the carpet edge portions to the joining tape.

Figure 3:
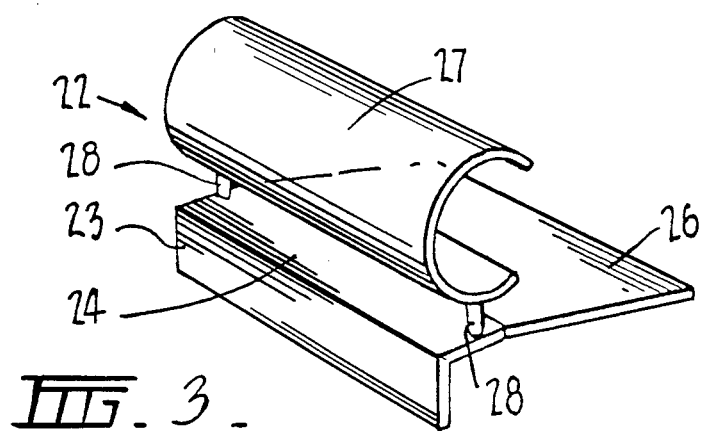
FIG. 3 is a perspective view showing a device for assisting in the removal of the seaming/unseaming tape from beneath the joined edged portions of a carpet and FIG. 4 is a circuit diagram illustrating one form of the control apparatus of the invention.

After the abutting edge portions of the carpet are adhered to the joining tape the seaming/unseaming tape maybe removed from beneath the seam. This maybe done simply by longitudinally withdrawing the seaming/unseaming tape but more preferably by utilizing the device illustrated in FIG. 3. The device 22 comprises an end flange 23, a top flange 24 and a sloping guide flange 26. A curved guide plate 27 is mounted above and spaced from the top flange 24 on legs 28. In use, the guide flange 26 is positioned beneath the end of the carpet seam which is usually adjacent a wall in a building or the like in which the carpet is being installed. The end flange and top flange enable the device 22 to be located over any existing carpet edging strip commonly used for securely the carpet in position. The end of the seaming/unseaming tape is passed between the top flange 24 and the curved guide flange 26 and passes over the guide flange 26 to enable the seaming/unseaming tape to be withdrawn by applying tension in the direction of the carpet seam.

In performance of the method above described electrical current is passed through the metal foil 14 of the seaming/unseaming tape by connecting an electrical potential between longitudinally spaced points along the length of the foil and preferably to the foil where it projects from each end of the seam to be made. However, in performing the invention utilizing the seaming/unseaming tape of FIG. 2, electrical potential maybe provided between the foil sections 17 and 18 at one end of the seam and by connecting an electrical shorting member across the foil sections 17 and 18 at the opposite end of the seam. With this arrangement, relatively long lengths of seams can be made without the need to use long leads to connect a power source to the foil.

The seaming/unseaming tapes of the invention may also be used for assisting in removal of a carpet joining tape from a previously made join. The carpet joining tape is cut along the line of the seam the edge portions of the carpet are bent back to enable the seaming/unseaming tape of the invention to be positioned beneath the line of the seam. An electric current is then passed through the metal foil 14 of the seaming/unseaming tape to generate heat to soften the heat softenable adhesive bonding the carpet joining tape to the carpet edge portions. When the adhesive is sufficiently softened or melted the joining tape portions are easily peeled from the carpet edge portions leaving the edge portions ready for re-joining when desired.

To assist in removal of the seaming/unseaming tape following either a seaming or unseaming operation, it is preferred that the metal foil strip 14 and any exposed backing 12 be lightly dusted with a release powder, such as talc. The release powder tends to prevent any adhesive material which may flow from the joining tape adhereing to the foil 14 or backing 12.

It will be appreciated that the methods of seaming and unseaming of the present invention maybe conducted satisfactorily in some circumstances without the use of a backing 12. Thus, the seaming and unseaming methods of the invention include the use of a foil releaseably positioned beneath the carpet edge portions without a backing attached thereto.

Figure 4:
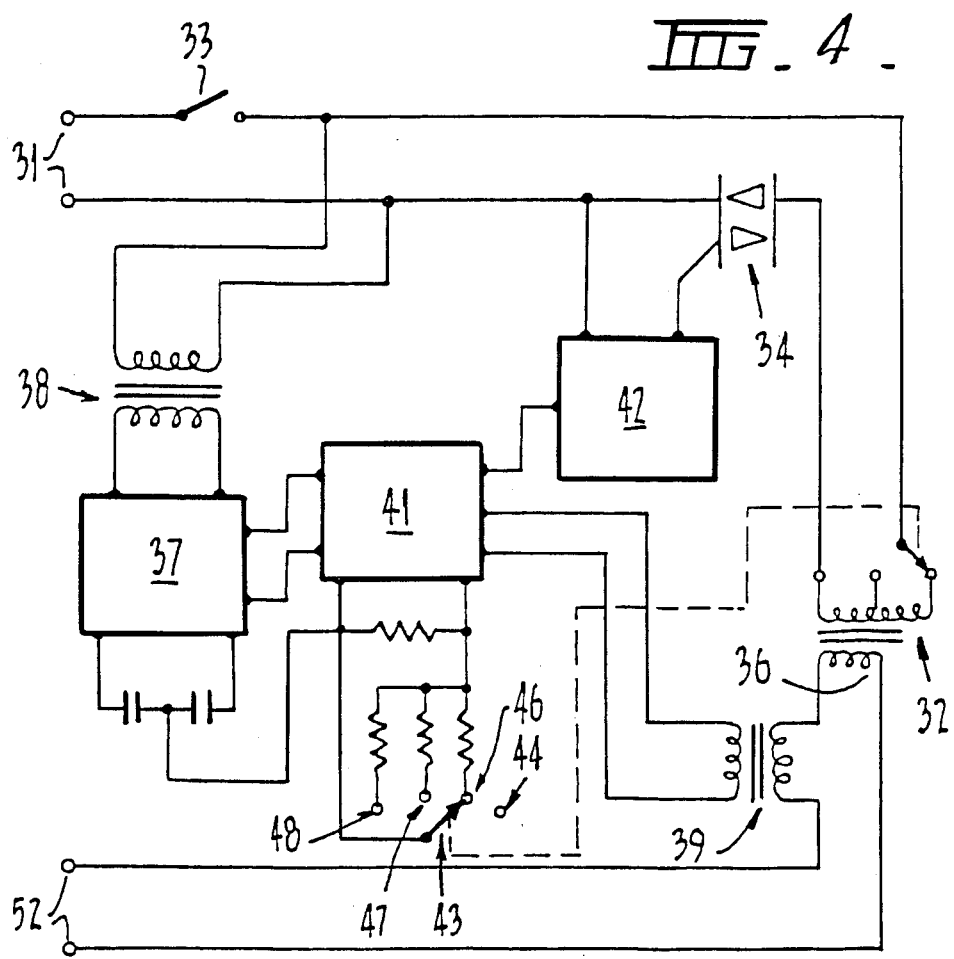

In performing particularly the seaming method of the invention electrical current caused to flow through the metal foil 14 is provided by a controlled apparatus which is adapted to be connected to a mains power source and which provides a relatively low voltage to the metal foil. Referring to FIG. 4, the power input, which is connected to input terminals 31, is connected to a power transformer 32 via a switch 33 and Triac 34. The secondary winding 36 of the power transformer 32 produces an output of approximately 30 volts a.c. which is to be applied to the metal foil 14.

The output power is controlled by a Triac controll circuit which includes a power supply 37 derived from a small transformer 38 connected in parallel with the power transformer 32.

A current transformer 39 is connected into the output circuit of the power transformer 32 to sense the current flowing in the output circuit. The current transformer 39 provides a signal for a current feedback amplifier 41 which drives a phase control circuit 42 which is connected to the Triac 34 to control the firing thereof. The output from the current feedback amplifier 41 is depended on selector switch 43 which maybe switch between a "heat" position 48, a "hold" position 47, a "low" position 46 and an "off" position 44. In any of the "heat", "hold" and "low" positions the firing of the Triac 34 is adjusted to give a predetermined output current. The gain of the current feedback amplifier 41 is depended on the control state selected and on the measured output current as determined by the current transformer 39. If the resistance between output terminals 52 varies in accordance with varying length of metallic foil strip to which the control apparatus is connected or varies with changing resistance due to temperature change, the output current varies and this variation is sensed by the current transformer which effectively changes the gain of the current feedback amplifier to increase the output ot that predetermined by the selected function. Thus, the control apparatus is self-adjusting to maintain maximum output current notwithstanding variations in the resistance of the metallic foil strip connected between the output terminals 52.

In the embodiment illustrated in FIG. 4, the power transformer 32 is provided with an overwound primary winding which acts to restrict input current to a predetermined maximum during "heat" function operation. When the selecter switch 43 is switched to the "hold" or "low" functions the transformer primary winding taps are also changed. Thus, the apparatus of this embodiment is able to be used when mains power sources have limited outputs without overloading the mains circuits.

Although the invention has been particularly described with regard to the joining of carpet pieces, it will be immediately appreciated that the invention maybe applied to joining other textiles or fabric materials, such as wall textiles or fabrics or other similar sheet material.

I claim:

1. A method of joining together edge portions of carpet or other material with a joining tape which has a heat-softenable adhesive and a reinforcing material, said method comprising the steps of:
   (a) locating the joining tape beneath the abutting edge portions so that both edge portions are in contact with the adhesive, and so that the reinforcing material overlaps both edge portions,
   (b) securing a strip of metal foil to a paper backing material by stitching to form an elongated heating element of a length greater than the length of the opposed abutting edge portions,
   (c) locating the heating element beneath the joining tape so that the metal foil is uppermost,
   (d) passing an electric current through said metal foil to generate heat therein,
   (e) controlling the current flow so that the heat generated at least softens said adhesive,
   (f) pressing the abutting edge portions of said sheets onto said joining tape to adhesively engage the reinforcing material with the edge portions;
   (g) stopping the current flow so as to cool the joining tape whereby the adhesive thereon sets and bonds the reinforcing material to the edge portions, and
   (h) removing the heating element by longitudinally drawing the metal foil and backing material from beneath the formed seam.

2. A method according to claim 1 wherein said joining tape includes a backing layer and said foil is disposed beneath and in contact with the backing layer.

3. A method according to claim 1, wherein a release powder is dusted onto said method foil to facilitate removal thereof.

4. A method according to claim 1, wherein the current flow through the metal foil is controlled to initially soften the adhesive to a tackiness whereby the adhesive releasably bonds the reinforcing to the sheets whereafter the current flow is increased to melt the adhesive.

5. A method according to claim 1 wherein two laterally spaced metal foil strips are secured to the paper backing strip by stitching, and electric heating current is flowed through the two metal foil strips in series.

6. A method of separating a joining tape from abutting edge portions of textile sheets, said joining tape being adhered to said edge portions by a heat softenable adhesive, comprising the steps of:
   (a) cutting said tape along the line of the abutting edges,
   (b) bending said edge portions away from each other,
   (c) locating a strip of metal foil along the line of the edge portions when in abutting relation,
   (d) engaging the joining tape sections on the edge portions with said metal foil strip,
   (e) passing an electric current through said metal foil strip to generate heat therein,
   (f) controlling the current flow so that the heat generated at least softens said adhesive, and
   (g) peeling the cut tape sections from said edge portions.

* * * * *